Jan. 8, 1935. C. W. HALL 1,987,105
ROTARY VALVE ENGINE
Filed Jan. 26, 1934 3 Sheets-Sheet 2
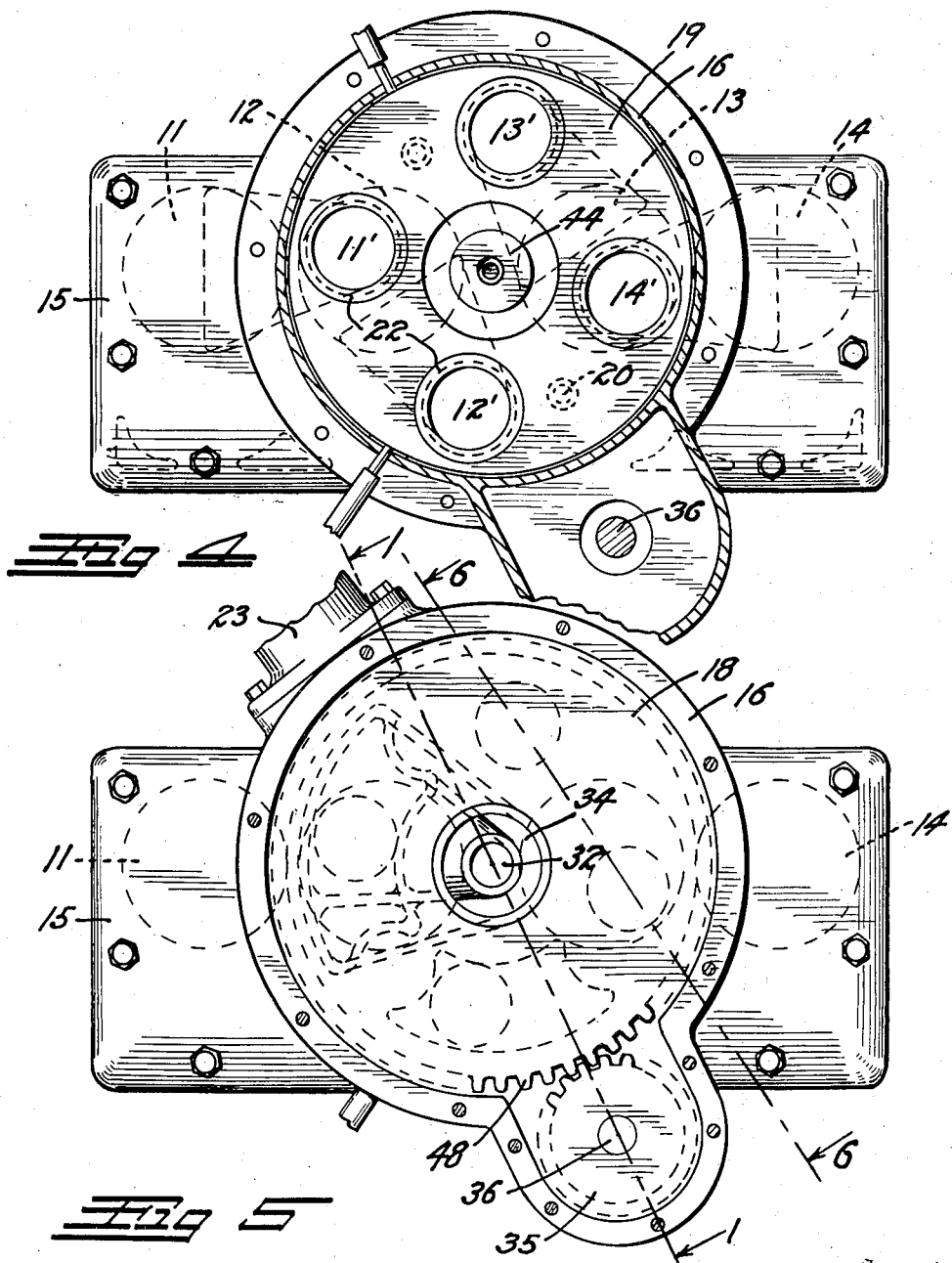

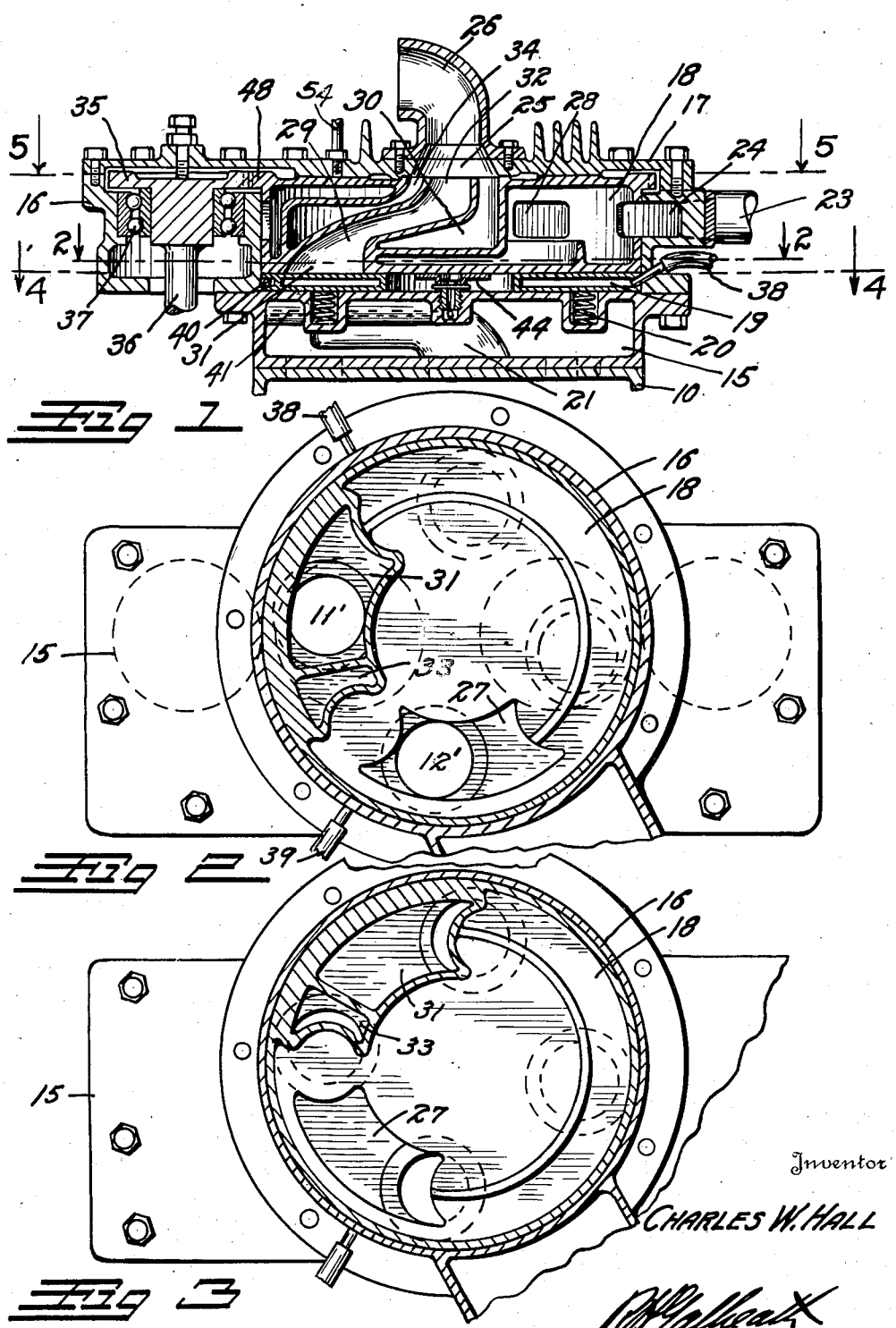

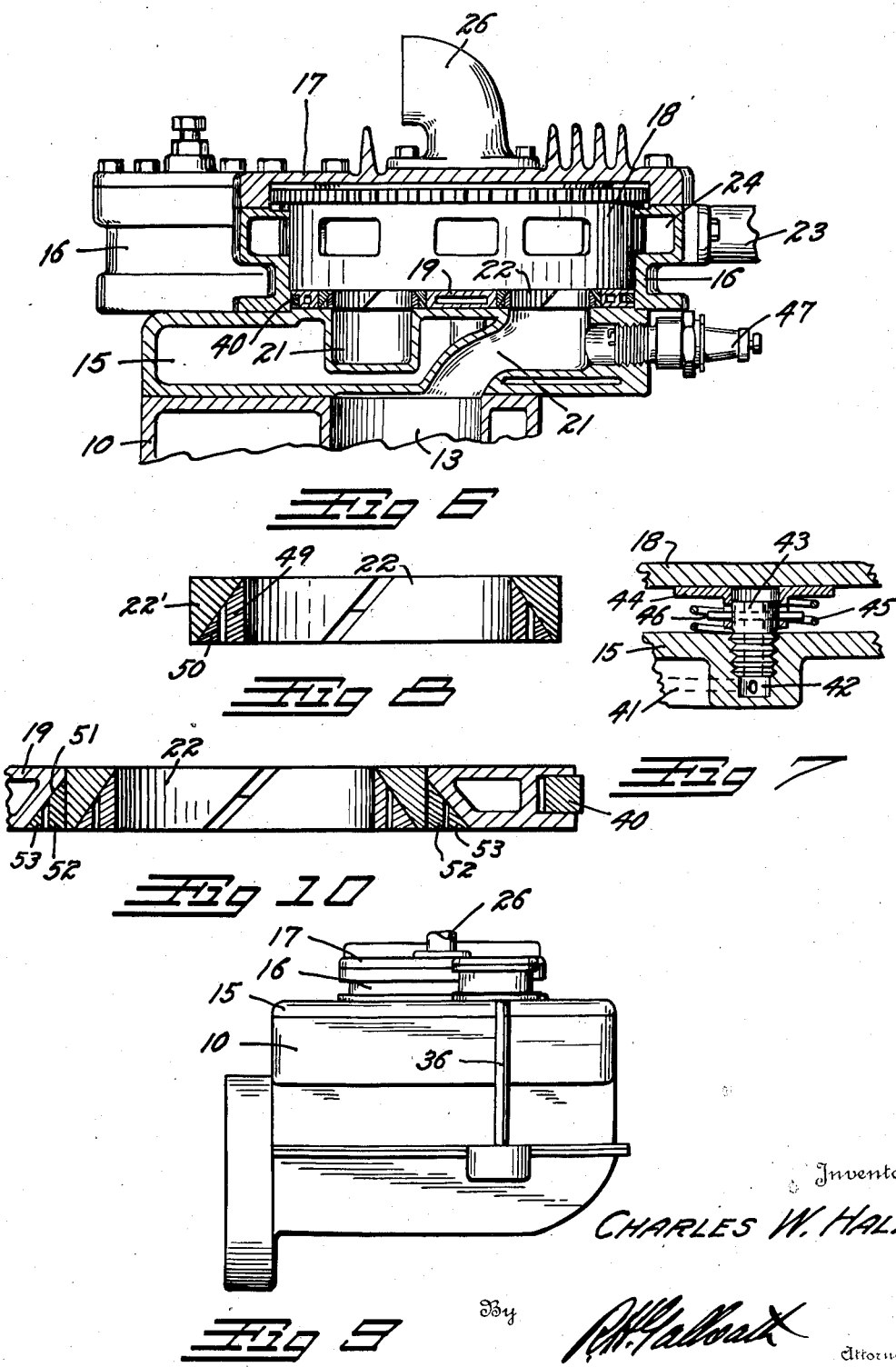

Patented Jan. 8, 1935

1,987,105

UNITED STATES PATENT OFFICE 1,987,105

ROTARY VALVE ENGINE

Charles W. Hall, Denver, Colo.

Application January 26, 1934, Serial No. 708,400

9 Claims. (Cl. 123—190)

This invention relates to a rotary valve for internal combustion engines. The principal object of the invention is to provide a highly efficient valve construction in which a single valve member will efficiently control the intake and exhaust of a plurality of cylinders, and which will eliminate all reciprocating valve mechanisms.

Another object of the invention is to so construct the valve that it will create a suction or vacuum action to assist in scavenging the cylinders.

A further object of the invention resides in the means employed for effectively lubricating the valve constructions and for sealing and maintaining the same at an efficient temperature.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a cross section through the valve structure, taken on the line 1—1, of Fig. 5.

Fig. 2 is a horizontal section looking downwardly, taken on the line 2—2, Fig. 1.

Fig. 3 is a similar horizontal section illustrating the valve in a different position.

Fig. 4 is a horizontal section illustrating the sealing plate, taken on the line 4—4, Fig. 1.

Fig. 5 is a horizontal section taken on the line 5—5, Fig. 1.

Fig. 6 is a vertical section taken on the line 6—6, Fig. 5.

Fig. 7 is a detail view illustrating the lubricating applicator for the valve.

Fig. 8 is a detail section through a type of sealing ring employed in the sealing plate.

Fig. 9 is a side elevation of a typical motor block with the invention applied thereto.

Fig. 10 is a detail section through an alternate form of sealing ring for the sealing plate.

In the drawings: a typical engine block is indicated at 10 with a plurality of cylinders 11, 12, 13 and 14. The valve as illustrated is applied to a four cylinder block. It is conceivable, however, that it might be applied to a block with more or less cylinders if desired. The engine block 10 is closed with a cylinder head 15 in which passages 21 are formed to connect the various cylinders with the valve. A valve housing 16 is secured on the head 15 and the valve housing in turn is closed by means of a cap 17. The valve housing contains a cylindrical bore for receiving a cylindrical, drum-like rotary valve 18.

Between the cylinder head 15 and the rotary valve 18 a sealing plate 19 is positioned. This plate is an annular flat disc which is constantly forced into close contact with the bottom of the rotary valve 18 by means of suitable springs 20. In a four cylinder motor the sealing plate 19 is provided with four port openings which in the drawings are designated by prime numerals corresponding to the number of the cylinder to which they communicate as 11', 12', 13' and 14'. Each of the ports 11' to 14' communicate with its respective cylinder through one of the passages 21 in the cylinder head 15. The position of these passages is indicated in broken line in Fig. 4. An annular sealing ring 22 snugly fits each of the ports in the sealing plate so as to seal the passages 21 to their respective port openings in the plate 19. The sealing plate does not rotate but remains stationary so as to maintain its ports constantly in alignment with their respective passages.

The valve housing 16 is provided with an intake 23 which opens to an annular intake passage 24 partially surrounding the rotary valve 18. The cap 17 is formed with a Venturi-shaped exhaust outlet 25 leading to any desired exhaust pipe 26. The exhaust outlet 25 is positioned exactly about the center of rotation of the valve 18. The bottom of the valve 18 contains an elongated intake opening 27 positioned so that it will pass successively over the ports in the sealing plate 19.

A series of openings 28 are formed about the wall of the valve 18 opening to the surrounding intake passage 24 so as to allow the intake gases to be drawn inwardly through the inlet 23, the passage 24, and the openings 28 into the hollow interior of the valve 18. From here the gases are drawn through the opening 27 into one of the ports in the sealing plate, thence through its passage 21 to the cylinder.

Within the valve 18 a high pressure exhaust passage 29 is formed, surrounded by a low pressure exhaust passage 30. The high pressure exhaust passage 29 communicates through the bottom of the valve in a relatively large high pressure opening 31 and terminates at the top of the valve in a relatively small, discharge nozzle 32 positioned centrally of the outlet 25. The second exhaust passage 30 communicates through the bottom of the valve through a relatively small low pressure opening 33 and terminates at the top of the valve in an annular discharge 34 surrounding the nozzle 32. The action of this arrangement will be later described.

The valve 18 may be rotated in any desired manner such as from a pinion 35 mounted on the upper extremity of a drive shaft 36 extending from a connection with the engine crank shaft. The pinion 35 is mounted in suitable ball bearings 37 in an extension of the valve housing 16. A ring gear 48 completely surrounds the valve 18 and meshes with the pinion 35. This is a suggested method for rotating the valve. It is conceivable that it might be rotated in other ways.

The sealing plate 19 is preferably hollow so as to provide a water cooling space. The water is conducted to the plate through a suitable intake tube 38 and discharged therefrom from a similar tube 39. It is preferred to surround the periphery of the sealing plate with a junk ring 40 which acts as a heat conductor to the water cooled walls of the valve housing 16.

Lubrication is provided to the lower surface of the valve 18 through an oil conductor 41 which terminates in a central discharge 42 immediately below the middle of the valve 18. A nipple 43 is threaded into the central discharge 42. This nipple carries what might be termed a flanged ferrule 44 which is vertically slidable on the nipple and constantly pressed against the valve 18 by means of a compression spring 45. A cross pin 46 in the nipple passes through slotted openings in the ferrule to prevent rotation of the ferrule. The oil is forced upwardly through the nipple 43 and outwardly between the ferrule and the bottom of the valve 18. Centrifugal action causes the oil to spread outwardly over the bottom surface of the valve so as to effectively lubricate the bearing contact between the sealing plate 19 and the valve 18, and the sealing rings 22.

A suitable spark plug 47 is positioned in each of the passages 21 to ignite the charge therein at the proper time. The spark plug of course could be placed at any other desired point in communication with the cylinder.

The sealing ring 22 may have any suitable form which will allow it to expand axially so that it will maintain contact with the bottom of the valve and with the top of the cylinder head 15 so as to seal these two parts together. One method for accomplishing this is shown in Fig. 8 in which the ring is formed from a main endless ring 22' of a width substantially equal to the width of the sealing plate 19 and of a thickness equal to the total thickness of the ring. The front face of the main ring 22' is bevelled and against this front face two spring rings 49 and 50 bear. These minor rings have bevelled faces and are split so that their inherent elasticity will constantly force them against the bevelled face of the main ring 22'. This acts to expand the entire assembly axially so that it will always seal the space between the lower surface of the valve 18 and the upper surface of the head 15.

*Operation*

Let is assume that the cylinders are to fire in the following order 11, 13, 14, 12, and that the valve is rotating in a clockwise direction. The intake opening 27 passes over the port 11', allowing the piston in the cylinder 11 to suck in a charge of gas. The opening 27 then passes from the port 11 so as to close the latter. This allows the piston in cylinder 11 to move upwardly and compress the gas therein. At the point of compression, the gas will be ignited by the spark plug 47 and the piston will move downwardly to the bottom position. At this time the first discharge opening 31 will have reached the port 11' and will begin to open the port allowing the high pressure gas therein to discharge into the discharge passage 17 and through the nozzle 32. This high pressure discharge of gas through the Venturi-shaped outlet 25 creates a partial vacuum in the second exhaust passage 30 so that when the latter is opened to the port 11' through the opening 33 the burnt gas will be sucked from the cylinder by this partial vacuum. Just before the opening 33 closes the port 11', the opening 31 will begin to open the port 13' which at this time has just completed its explosion cycle. This allows high pressure gas from the port 13' to discharge through the central passage 29 to continue the Venturi or suction effect on the passage 30 to assist in the final scavenging of the cylinder 11. As soon as the opening 33 closes the port 11, it will be again opened by the intake opening 27 for the admission of a fresh charge of gas.

The cycle has been described as applied to one cylinder. It will be repeated on each of the cylinders in their turn as the valve openings pass their respective ports, and each cylinder will receive the effect of the scavenging action of the high pressure discharge of the succeeding cylinder.

The temperature of the sealing plate is always kept at a practical point by the water, or other cooling medium, within its hollow interior. It will be noted that the openings in the periphery of the rotary valve 19 are irregularly spaced. This is done to decrease the siren-like effect of regularly placed openings and to reduce unnecessary noise.

While the intake chamber 24 is illustrated as only partially surrounding the valve, it could, if desired, completely surround the valve.

It is desired to call attention to the fact that the sealing rings 22 are free to rotate in their respective ports and, owing to the difference in the frictional speeds at their inner and outer areas they do rotate in their ports. This causes them to wear evenly at all points and also acts to spread the lubricant evenly over the rings and the plate 19. It will be noted that the internal pressure within the sealing rings acts to force the inner rings outwardly so as to create a seal between the various parts of the ring and between the valve 18 and the head 15 that is proportionate to the pressure to be sealed.

The junk ring 40 assists in transferring or conducting heat from the sealing plate 19 to the cooled walls of the housing 16.

It is also desired to call attention to the three-piece design of the valve enclosing parts. They comprise the head 15, the housing 16, and the cap 17. This greatly facilitates manufacture, assembly and maintenance.

In Fig. 10 an alternate form of port seal for the sealing plate 19 is illustrated. In this form, the port upon the plate is conically bevelled as shown at 51 to provide a seat for one or more oil control rings 52 and 53. The latter rings have bevelled contact surfaces and are externally expanding so as to stop oil from entering the port openings in the sealing plate. An oil line 54 may be provided to supply lubricant to the upper or thrust surface of the valve 18.

The upper surface or thrust bearing of the valve 18 may be lubricated in any desired manner, such as through a lubricating pipe 54.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. In a rotary valve: a first exhaust passage etxending through said valve from a port in one face thereof; a second exhaust passage extending about said first passage from a port adjacent the port of said first passage.

2. In a rotary valve: a first exhaust passage extending through said valve from a port in one face thereof; a second exhaust passage extending about said first passage from a port adjacent the port of said first passage, so that said two ports will successively receive the exhaust from an engine cylinder, said passages terminating adjacently; and a Venturi-shaped conduit surrounding the adjacent discharges of said passages.

3. In a rotary valve, a first central exhaust opening in one face of said valve; a second exhaust opening in said latter face adjacent said first opening; a conduit for receiving the discharge from both openings, said conduit being shaped and positioned so that the discharge from one opening will create a suction on the other opening.

4. A rotary valve for internal combustion engines comprising: a hollow cylindrical rotatable valve having opposed first and second lateral faces; a first exhaust opening in the first of said faces; a second exhaust opening in said first face; an intake opening in said first face, all of said openings being positioned to one side of the axis of said valve; a first passage extending from said first exhaust opening through the axis of the second lateral face; a second passage extending from said second exhaust opening through said second lateral face about said first passage; and peripheral openings in the cylindrical wall of said valve communicating with said intake opening through said valve.

5. A rotary valve for internal combustion engines for rotation in a ported valve housing comprising: a hollow cylindrical valve; an exhaust opening in one lateral plane face of said valve to one side of the axis thereof; an intake opening in said lateral face spaced from said exhaust opening and also positioned eccentrically of the axis; an exhaust opening in the opposite plane face of said valve positioned concentrically of the axis; a conduit extending through said valve from said face to said second exhaust openings, the remainder of said valve being hollow, and communicating with said intake opening, and there being a series of openings about the cylindrical surface of said valve.

6. A rotary valve for internal combustion engines for rotation in a ported valve housing comprising: a hollow cylindrical valve; an exhaust opening in one lateral plane face of said valve to one side of the axis thereof; an intake opening in said lateral face spaced from said exhaust opening and also positioned eccentrically of the axis; an exhaust opening in the opposite plane face of said valve poistioned concentrically of the axis; a conduit extending through said valve from said face to said second exhaust openings, the remainder of said valve being hollow, and communicating with said intake opening, there being a series of openings about the cylindrical surface of said valve; and an intake chamber surrounding the cylindrical surface of said valve and constantly open to the openings in said cylindrical surface.

7. In a rotary valve, a first exhaust passage extending through said valve from a first port in one lateral face thereof; a second exhaust passage adjacent said first passage and extending through said valve from a second port adjacent said first port.

8. In a rotary valve, a first exhaust passage extending through said valve from a port in one face thereof; a second exhaust passage extending about said first passage from a port adjacent the port of said first passage, so that said two ports will successively receive the exhaust from an engine cylinder, said passages terminating adjacently.

9. In a rotary valve having a lateral ported face, an annular open centered plate; means for urging said plate against said ported face; a pressure member arranged within the open center of said plate; means for urging said pressure member against said valve; and means for conducting lubricant to said pressure member.

CHARLES W. HALL.